Sept. 23, 1958　　　R. V. KLIKUNAS　　　2,853,092
AIR AND VACUUM RELEASE VALVE
Filed July 29, 1954
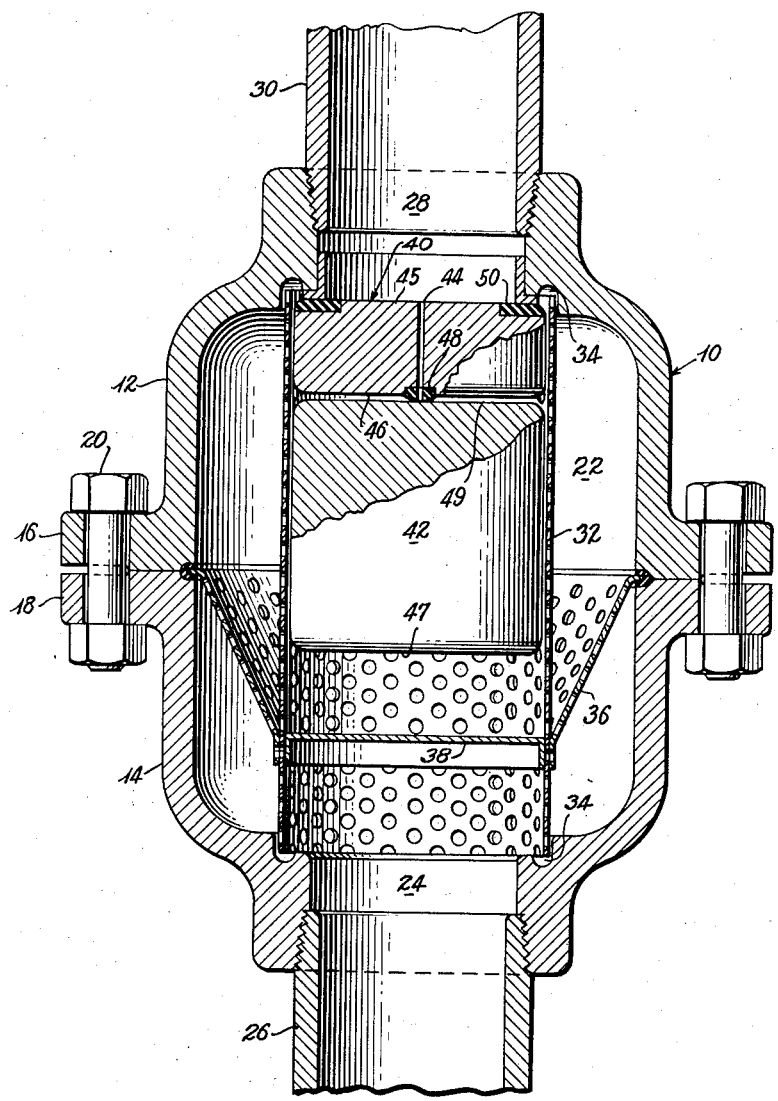
INVENTOR
*Richard V. Klikunas*
BY *Mead, Browne, Schuyler
& Beveridge*
ATTORNEYS

United States Patent Office 2,853,092
Patented Sept. 23, 1958

2,853,092

AIR AND VACUUM RELEASE VALVE

Richard V. Klikunas, Albany, N. Y., assignor to Rensselaer Valve Co., Troy, N. Y., a corporation of New York Application July 29, 1954, Serial No. 446,634

9 Claims. (Cl. 137—202)

This invention relates to relief valves and more particularly to air and vacuum release valves.

In many types of hydraulic and plumbing installations it is necessary to provide relief valve means to permit discharge of air from pipe lines or liquid containers. For example, it is frequently necessary to provide means for the escape of air from pipe lines or containers which are being filled with liquid, or to permit escape of accumulated air under pressure from the high points of pipe lines or containers. Similarly, it is also frequently necessary to provide means for admitting air into pipe lines or containers which are being emptied of liquid to prevent the existence of a vacuum due to the removal of the liquid.

While various devices have been provided for accomplishing the purposes just mentioned, many of these devices are relatively complicated in construction and require the use of moving parts, levers and linkages which are sometimes not entirely reliable in their operation.

Accordingly, it is an object of this invention to provide an air and vacuum release valve which is simple in construction and does not require the use of operating linkages.

It is a further object of this invention to provide an air and vacuum release valve which is simple and reliable in operation.

It is another object of this invention to provide an air and vacuum release valve in which the condition-responsive element acts directly to open or close a vent opening rather than requiring an operating linkage.

In achievement of these objectives, this invention provides an air and vacuum release valve in which an upper and a lower float member are disposed within the valve chamber, being constrained to move along a path in alignment with a vent opening by means of a perforated tubular guide member. The upper float member is provided with an axial relief passage which may be closed by contact with the lower float member. Liquid admitted to the valve chamber causes both float members to rise, ejecting air through the vent until the upper member seals the vent opening and the lower member seals the axial passage in the upper member. If the air pressure in the chamber increases, the liquid level drops, causing the lower member to drop, but the upper member still remains in sealing engagement with the vent opening. However, the axial passage of the upper element is exposed, permitting relief of the excess pressure. If the liquid level in the system drops, the level in the valve chamber drops, permitting both float elements to drop. This causes the upper float member to drop out of sealing engagement with the vent opening and prevents the existence of a vacuum in the valve chamber.

Further objects and advantages of the invention will become apparent from the following description taken in conjunction with the accompanying drawing in which the single figure represents a view in vertical section of an air and vacuum release valve in accordance with the invention.

Referring now to the drawing, there is shown a release valve generally indicated at 10 comprising upper and lower casing sections 12 and 14, having mating radially extending flanges 16 and 18 which are secured together by bolts 20. The assembled casing sections 12 and 14 define a hollow valve chamber 22. Lower casing section 14 is provided at its lower end with an inlet passage 24 which receives an inlet pipe 26 connected to the liquid containing system. Upper casing section 12 is provided at its upper end with a vent passage 28 which is connected to an outlet vent pipe 30. The inlet passage 24 and the vent passage 28 are in alignment with each other.

A cylindrical perforated guide member 32 extends vertically through valve chamber 22 between inlet passage 24 and vent passage 28. The opposite ends of perforated guide 32 are received in annular grooves 34 in the inner surfaces of the upper and lower casing sections 12 and 14 adjacent the inlet and vent openings. A cone-shaped baffle member 36 has its outer peripheral edge supported by a peripheral groove located at the joint between casing sections 16 and 18. The inner peripheral edge of baffle 36 is secured to the outer periphery of tubular guide member 32. A base or support member 38 is positioned in the lower portion of tubular guide member 32 and serves as a rest or support which limits the maximum downward movement of the float valve elements 40 and 42.

The float elements include an upper member 40 and a lower member 42. These members are made of a pliable or resilient material and have a specific gravity less than that of the liquid which enters through the inlet duct 26. Both the members 40 and 42 are of generally cylindrical shape. The upper member 40 has an axially extending relief passage 44 communicating between its upper and lower surfaces 45 and 46. On lower surface 46 member 40 is provided with a small spacer member through which relief passage 44 extends, spacer member 48 projecting a short distance below lower surface 46 and being engageable with the upper surface 49 of lower float member 42. The spacing which must always necessarily exist between facing surfaces 46 and 49 due to spacer member 48 causes these surfaces to be exposed to pressure conditions inside chamber 22. Upper surface 45 of float 40 is provided with a countersunk peripheral shoulder upon which is seated a sealing gasket 50 which engages vent 28 in sealing relation when the float 40 is in the position shown in the drawing.

The operation of the air or vacuum release valve will now be described. Inlet duct 26 of valve 10 is connected to a pipe line or other liquid container through a suitable cut-off valve. Outlet duct 30 is connected to atmosphere. When the pipe line or container is first filled with liquid, and before the liquid level has reached the interior of valve chamber 22, both float elements 40 and 42 are in their unactuated or down position in which the lower surface 47 of float element 42 rests on support member 38, and upper float element 40 rests on the upper surface of lower float element 42 but spaced a slight distance therefrom due to the interposed spacer member 48. During this condition, vent passage 28 communicates freely with the interior of valve chamber 22. As the liquid level rises in valve chamber 22, float elements 40 and 42 are raised upwardly toward the vent 28. Air above the rising liquid level is ejected through vent opening 28 by the rising liquid. When the liquid level has reached a predetermined level, float valve elements 40 and 42 will be raised sufficiently to seal outlet 28. This sealing action prevents liquid from passing out through vent 28. The position of the float elements during the sealed condition corresponds to the view shown in the drawing in which the sealing gasket 50 on the upper surface of float element 40 engages the mouth of vent outlet 28 in sealed engagement, and upper surface 49 of lower float element 42 engages spacer member 48 and seals the lower end of relief passage 44.

With float valve elements 40 and 42 in the sealed position shown in the drawing, if the air pressure inside valve chamber 22 increases, it pushes the liquid level in the valve chamber down. When the liquid level decreases to a certain point float element 42 drops out of sealing engagement with stop member 48, thereby permitting air to be released from chamber 22 through the axially extending relief passage 44. Upper float element 40 does not drop with lower float element 42 during this high pressure condition since the greater-than-atmospheric pressure inside valve chamber 22 acts upon lower surface 46 of float element 40 and urges float element 40 in an upward or sealing direction. As soon as the air pressure has been relieved due to the passage of air through relief passage 44, the liquid level rises again and again raises lower float element 42 into sealing engagement with stop 48, thereby resealing passage 44 and preventing further release of air from chamber 22. The cycle just described may be repeated periodically as air pressure increases inside chamber 22.

Float elements 40 and 42 also serve to prevent the occurrence of a vacuum condition inside chamber 22 when the liquid level in the chamber drops due to a lower liquid level in the system to which valve 10 is connected. Thus, if the liquid level drops in chamber 22 and assuming that a substantially normal atmospheric pressure exists in chamber 22 before the liquid level begins to drop, the dropping of the liquid level would normally tend to reduce the pressure inside chamber 22 to below atmospheric. However, a vacuum condition is prevented due to the fact the dropping liquid level in chamber 22 causes both the upper and lower float elements 40 and 42 to drop with the liquid level, thereby permitting air to enter chamber 22 through vent passage 28 and preventing the occurrence of a vacuum in the chamber. Since the air pressure in chamber 22 acting upon lower surface 46 of upper float member 40 is not greater than the atmospheric pressure acting upon the upper surface 45, there is no pressure differential tending to maintain float member 40 raised.

It can be seen from the foregoing that there is provided in accordance with this invention an air and vacuum release valve of simple construction and having no mechanical linkages. The valve is simple and reliable in operation and permits (1) ejection of air from the chamber when the system to which the valve is connected is being filled with liquid; (2) release of air from the interior of the valve chamber when an excessive air pressure condition occurs therein; and (3) admission of air to the chamber when the liquid level falls to thereby prevent the occurrence of a vacuum condition inside the chamber.

While there has been shown and described a particular embodiment of the invention, it will be obvious to those skilled in the art that various changes and modifications can be made therein without departing from the invention and, therefore, it is aimed to cover all such changes and modifications as fall within the true spirit and scope of the invention.

What I claim as my invention is:

1. An air and vacuum release valve for connection to a liquid containing system comprising a valve chamber, an inlet opening to said valve chamber, a relief vent connected to said valve chamber above said inlet opening, a first and a second valve element disposed in said chamber and movable relative to each other, said first valve element being disposed above said second valve element and being engageable in sealing relation with said relief vent, said first valve element having a relief passage extending therethrough in registry with said relief vent, said second valve element being adapted to float in the liquid of the system to which said valve is connected and being engageable in sealing relation with said relief passage to prevent fluid flow through said passage, and guide means disposed about the outer periphery of both of said valve elements and extending toward said relief vent to guide said valve elements in their movement relative to said relief vent.

2. An air and vacuum release valve for connection to a liquid containing system comprising a valve chamber, an inlet opening to said valve chamber, a relief vent connected to said valve chamber above said inlet opening, a first and a second float element disposed in said chamber and movable relative to each other, said first float element being disposed above said second float element and being engageable in sealing relation with said relief vent, said first float element having a relief passage extending therethrough for communication with said relief vent, said second float element being engageable in sealing relation with said relief passage to prevent fluid flow through said passage, and guide means disposed in said chamber to guide said valve elements in their movement relative to said relief vent.

3. An air and vacuum release valve for connection to a liquid containing system comprising a valve chamber, an inlet opening to said valve chamber, a relief vent connected to said valve chamber above said inlet opening, a first and a second valve element disposed in said chamber in alignment with said relief vent, said valve elements being movable relative to each other, said first valve element being disposed above said second valve element and being engageable in sealing relation with said relief vent, said first valve element having a relief passage extending therethrough, one end of said passage extending into communication with said vent, the opposite end of said passage extending into communication with said chamber, said second valve element being adapted to float in the liquid of the system to which said valve is connected and being engageable in sealing relation with said relief passage to prevent fluid flow through said passage, and guide means disposed about the outer periphery of both of said first and second valve elements and extending toward said relief vent to guide said valve elements in their movement relative to said relief vent.

4. An air and vacuum release valve for connection to a liquid containing system comprising a valve chamber, an inlet opening to said valve chamber, a relief vent connected to said valve chamber above said inlet opening, an upper and a lower valve element disposed in said chamber in alignment with said relief vent, said valve elements being movable relative to each other, said upper valve element being engageable in sealing relation with said relief vent, said upper valve element having a relief passage extending therethrough, one end of said passage extending into communication with said vent, the opposite end of said passage extending into communication with said chamber, said lower valve element being adapted to float in the liquid of the system to which said valve is connected, a surface of said lower valve element being engageable in sealing relation with said relief passage to prevent fluid flow through said passage, spacer means carried by one of said valve elements to maintain a predetermined spacing between said upper and lower valve elements when said lower valve element is engaged in sealing relation with said relief passage, and guide means disposed about the outer periphery of both of said first and second valve elements and extending toward said relief vent to guide said valve elements in their movement relative to said relief vent.

5. An air and vacuum release valve for use in connection with a liquid containing system comprising a valve chamber, an inlet opening to said chamber, a relief vent connected to said chamber above said inlet opening, an upper and a lower valve element disposed in said chamber in alignment with said relief vent, said valve elements being movable relative to each other, said upper valve element being engageable with said relief vent in sealing relation thereto, said upper valve element having a relief passage extending therethrough, one end of said passage extending into communication with said relief vent, the opposite end of said passage extending into communication with said chamber, said lower valve element being adapted to float in the liquid of the system to which said valve is connected and being engageable in sealing relation with said relief passage to prevent fluid flow through said passage, and guide means disposed about the outer periphery of both of said valve elements to guide said valve elements in their movement relative to said relief vent.

6. An air and vacuum release valve comprising a valve chamber, an inlet opening to said valve chamber, a relief vent disposed at the upper end of said valve chamber, a movable valve element having a substantially flat upper surface engageable with said relief vent in sealing relation thereto, a float member disposed below said movable valve element and movable relative thereto, said valve element having a relief passage extending therethrough, one end of said passage communicating with said relief vent, the opposite end of said passage communicating with said chamber, said float member being engageable in sealing relation with said opposite end of said relief passage to prevent fluid flow through said passage, and guide means disposed about the outer periphery of both of said first and second valve elements and extending toward said relief vent to guide said valve elements in their movement relative to said relief vent.

7. An air and vacuum release valve for use with a liquid containing system comprising a valve chamber, an inlet opening to said valve chamber, a relief vent disposed at the upper end of said valve chamber, an upper and a lower float member disposed in said chamber, said float members being movable relative to each other, liquid permeable guide means extending vertically in said chamber and surrounding said upper and lower float members, said guide means maintaining said float members in alignment with each other and with said relief vent, said upper float member being engageable with said relief vent whereby the upper surface of said upper float member is exposed to the pressure exterior of said valve chamber, said upper float member having a vertically extending relief passage therethrough, one end of said passage extending into communication with said relief vent, the opposite end of said passage communicating with said chamber, said lower float member being engageable in sealing relation with said relief passage to prevent fluid flow through said passage, and spacer means carried by one of said float members to maintain a predetermined spacing between said float members when said lower float member is in sealing relation with said relief passage whereby the lower surface of said upper float member is exposed to the pressure within said valve chamber.

8. In an air and vacuum release valve for use with a liquid containing system, a casing enclosing a valve chamber having a lower inlet opening and an upper vent opening, a tubular perforate guide element in said chamber aligned with said vent opening, a multi-part valve slidably disposed in said guide element for axial movement therein toward and away from said vent opening and including an upper valve part having an annular upper surface portion engageable with said casing and a lower valve part, both of said parts having a density less than that of the liquid contained in said systems, and means on one of said parts engaging the other of said parts to retain the parts in spaced relation and to subject adjacent surface areas thereof to the interior pressure of said chamber, said upper valve part having a vertical relief passage extending completely therethrough to permit air to escape to said vent opening when said lower valve part moves downwardly with respect to said upper valve part.

9. In an air and vacuum release valve for use with a liquid containing system, a casing enclosing a vertical valve chamber and having an annular valve seat at the upper end thereof, an upper vent opening beyond the seat and a lower liquid inlet, a perforate guide tube aligned with the said valve seat, a first valve member disposed in said guide tube and of a density less than that of the liquid in said chamber, a second valve member disposed in said guide tube and of a density less than that of the liquid in said chamber, said first member being superimposed on said second member, the exposed upper surface of said first member being engageable with said valve seat, said first member having a vertical relief passage disposed inwardly of said seat, and means on one of said members abuttable with the other of said members to space the adjacent surfaces thereof and to subject said adjacent surfaces of said members individually to the interior pressure of said chamber, said last mentioned means communicating with said relief passage so that the abutment of said members seals said passage.

References Cited in the file of this patent

UNITED STATES PATENTS

| | | |
|---|---|---|
| 785,594 | Crispin | Mar. 21, 1905 |
| 1,009,044 | Burgess | Nov. 21, 1911 |
| 2,179,750 | McCracken | Nov. 14, 1939 |